(12) United States Patent
Gretz

(10) Patent No.: US 6,180,879 B1
(45) Date of Patent: Jan. 30, 2001

(54) ELECTRIC BOX EXTENDER AND SUPPLEMENTAL PARTS

(75) Inventor: Thomas J. Gretz, Clarks Summit, PA (US)

(73) Assignee: Arlington Industries, Inc., Scranton, PA (US)

(*) Notice: Under 35 U.S.C. 154(b), the term of this patent shall be extended for 0 days.

(21) Appl. No.: 09/373,428

(22) Filed: Aug. 13, 1999

Related U.S. Application Data

(63) Continuation-in-part of application No. 09/003,244, filed on Jan. 6, 1998, now Pat. No. 5,959,246, which is a continuation-in-part of application No. 08/773,413, filed on Dec. 27, 1996, now Pat. No. 5,736,674, which is a continuation-in-part of application No. 08/667,083, filed on Jun. 20, 1996, now abandoned.

(51) Int. Cl.[7] .................................................. H01J 5/00
(52) U.S. Cl. .................................. 174/50; 174/58; 174/63; 220/4.02
(58) Field of Search .................................. 174/50, 17 R, 174/52.6, 58, 63, 66, 67, 57; 220/3.2, 3.4, 3.8, 4.02, 4.03, 241, 242, 3.92, 3.94; 248/906

(56) References Cited

U.S. PATENT DOCUMENTS

| | | | | |
|---|---|---|---|---|
| 5,736,674 | * | 4/1998 | Gretz | 174/50 |
| 5,873,480 | * | 2/1999 | Wells, Jr. | 220/4.02 |
| 6,060,660 | * | 5/2000 | Bauer | 174/52.1 |
| 6,060,661 | * | 5/2000 | O'Neill | 174/58 |
| 6,093,890 | * | 7/2000 | Gretz | 174/58 |
| 6,103,972 | * | 8/2000 | Hangarty | 174/53 |

FOREIGN PATENT DOCUMENTS

| | | | | |
|---|---|---|---|---|
| 1187590 | * | 5/1985 | (CA) | 174/50 |
| 1191952 | * | 5/1970 | (GB) | 174/50 |

* cited by examiner

Primary Examiner—Kristine Kincaid
Assistant Examiner—Dhiru R Patel

(57) ABSTRACT

The invention includes of a one-piece plastic molded box having an open face member, an open back, flanges coplanar with and extending from the face member, and four wings extending from the inward side of the face member. The extender can be inserted slidably into an existing electrical box with the four wings flexing toward each other to accommodate the box with flanges flush with the surface of newly installed sheet rock to form a box extender or with flanges flush with the existing electrical box to form a device insulator.

2 Claims, 9 Drawing Sheets

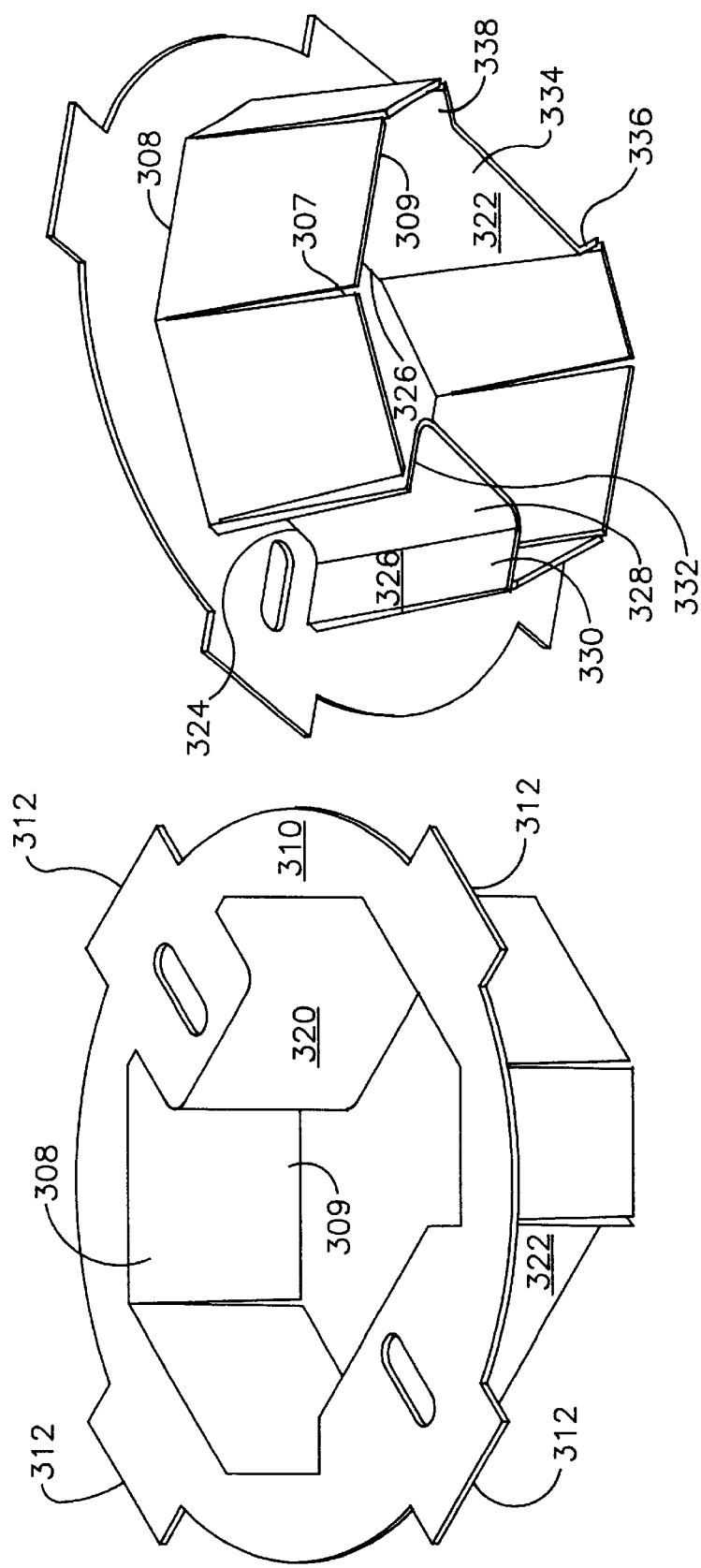

US 6,180,879 B1

ELECTRIC BOX EXTENDER AND SUPPLEMENTAL PARTS

CROSS-REFERENCE TO RELATED APPLICATION

This is a continuation-in-part of Application Ser. No. 09/003,244 now U.S. Pat. No. 5,959,246, filed Jan. 6, 1998, which was a continuation in part of Application Ser. No. 08/773,413 now U.S. Pat. No. 5,736,674, filed Dec. 27, 1996, which was a continuation-in-part of Application Ser. No. 08/667,083 is abandoned, filed Jun. 20, 1996

FIELD OF THE INVENTION

This invention relates to electric box extensions and to supplemental parts for electrical boxes, and particularly, to an improved electrical box extension that is easier to install and accepts bulky electrical devices such as a ground fault circuit interrupter (GFCI) and to supplemental parts that insert within existing electrical boxes to act as a device insulator to insulate electrical devices from an electrical box.

BACKGROUND OF THE INVENTION

Electrical boxes are commonly used to provide electrical service at convenient locations within buildings. The electrical boxes are commonly formed of plastic or metal and are usually securely fastened by screws or nails to the framework within the building. In newly constructed buildings, the open face of the electrical box, in which an electrical device such as an outlet or switch will be mounted, is usually flush with the surface of the wall or ceiling in which it is installed.

When existing buildings are renovated or restored, it is common for renovators to lay down new sheet stock such as sheet rock, paneling, etc., over the existing ceilings or walls. This causes the existing electrical boxes to become recessed within the wall by the thickness of the new sheet stock.

To solve this problem, box extenders of several different types have been developed. One type relies on a friction fit to hold the box extender in the existing electrical box. This extender has the disadvantage of not providing a secure attachment to the existing box, and the electrical device may slide further within the box making it hard to reach.

Another type of extender consists of an extension having walls of approximately the same configuration as the existing box and of fixed thickness. The extender is available in several thicknesses to accommodate several different sheet stock thicknesses. Although there are many thicknesses available, the extender sometimes is not of a proper thickness to bring the existing box flush with the new surface, and this creates an aesthetically undesirable appearance.

Another type of extender includes a body portion having at least one wall and open faces and a second open face. The extender includes side flanges having holes that align with brackets that are connected to the electrical box. This extender is difficult to use and install as brackets must be firmly attached to the electrical box and then two screws are used to attach each flange of the extender to the electrical box.

A supplemental part which is a variation of the electrical box extender can be used as a device insulator in those locations where an electrical device does not need to be extended to a new wall surface but rather where there is a limited amount of space to create a secure device which is not prone to shorting out. A typical example would be the installation of a GFCI device in an electrical box. The GFCI device is a bulky device that fits with little clearance into an electrical box. The terminals on the side of a GFCI are close fitting to the side of the metal electrical box and frequently the GFCI will be tripped when the terminals contact the side of the box. The supplemental part is inserted within an existing electrical box to act as a device insulator and keep bulky electrical devices insulated from the surrounding electrical box.

As described by these several limitations, extenders and supplemental parts of the present art have not proven fully satisfactory for extending electrical boxes flush with the new walls or ceilings in a renovated or restored building.

SUMMARY OF THE INVENTION

This invention consists of an extender and a supplemental part for use with electrical boxes. The extender is used for bringing electrical outlets, switches, ground fault circuit outlets, etc., flush with newly installed sheet stock or the like in a renovated building. The supplemental part is used to insulate electrical devices from their associated electrical box.

A first embodiment of the extender consists of a one-piece molded plastic box having an open face, an open back, and multiple flexible wings extending from the open face. The extender can be inserted slidably into an existing electrical box to extend an electrical device such as an outlet, switch, etc., so that it will be flush with a new surface. A second embodiment is similar to the first embodiment except the wings are separate pieces from the open face. A third embodiment consists of a one-piece unit having an open face, open back, and a continuous peripheral wall extending from the front face which can be trimmed away or cut into separate wings to suffice any installation.

A first embodiment of the supplemental part consists of a one-piece molded plastic box having an open face, an open back, and multiple flexible wings extending from the open face. The supplemental part can be inserted into an existing electrical box to act as a device insulator for bulky devices such as GFCI's to prevent the terminals of the device from contacting the walls of the electrical box and thereby causing a short. A second embodiment of the supplemental part consists of a one-piece molded plastic box having an open face, an open back, and four sides extending from the face with one or more of the sides including a flexible fold. As the second embodiment is inserted into an electrical box, the flexible fold would collapse allowing the supplemental part to fit into the box and act as a device insulator.

OBJECTS AND ADVANTAGES

One object of the present invention is to provide a one-piece plastic electrical box extender that will extend electrical boxes from a position deep within an interior surface of a building to a new position that is flush with a newly installed surface. The situation of having to bring electrical boxes flush with a new surface is commonly encountered when old buildings are renovated by laying down new sheet stock on top of existing sheet stock on walls and ceilings.

A second object of the invention is to ease the task of extending existing electrical boxes to a new surface. The invention is easily applied by inserting the extender slidably within the existing electrical box and pushing it within the box until flanges on the extender are flush with the new surface. New electrical connections are made and two screws are then inserted through the ears of the electrical device into flanges of the box extender and into the existing apertures on the pre-existing electrical box and then tightened to complete the installation. The invention is inexpensive and very easy to install when compared with extenders that are presently used in the trade.

A third object of the invention is to provide a supplemental part that acts as a device insulator for bulky electrical devices such as GFCI's.

Other objects and advantages of the preferred embodiment will become apparent when reading the attached description of the invention and referring to the associated drawings.

DESCRIPTION OF THE DRAWINGS

FIGS. 14 to 18 are a series of views of the invention for a hexagonal or round electrical box.

DESCRIPTION OF THE INVENTION

The invention is an electric box extender for extending an existing electrical box to bring it flush with a newly installed surface in a building. A second use of the invention is as a supplemental part to be used as a device insulator which provides insulation between an electrical device and an electrical box.

Figure 1:
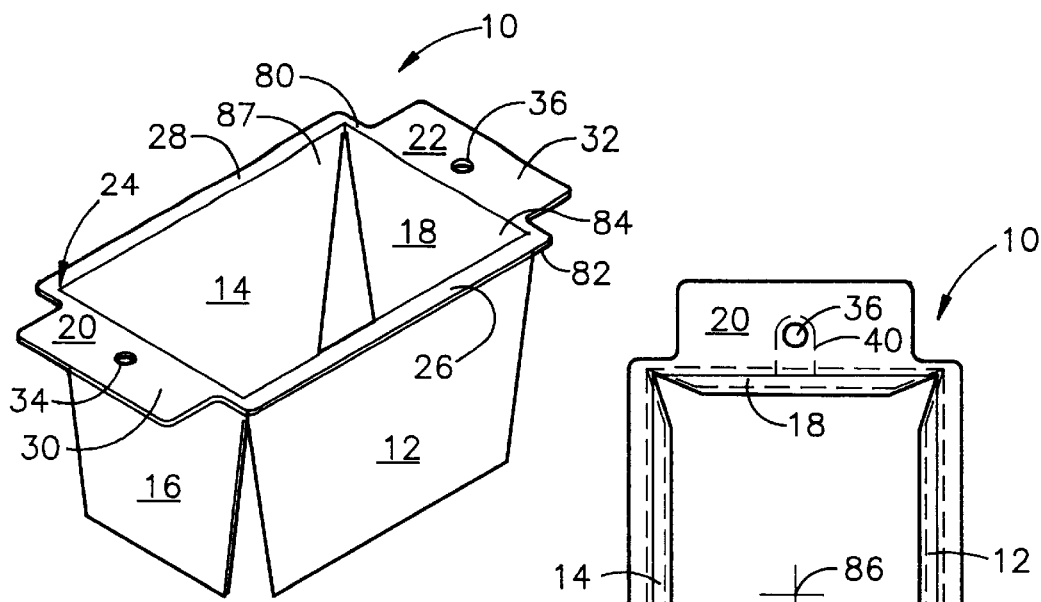
FIG. 1 is a perspective view of the preferred embodiment of the electric box extender.

A perspective view of the preferred embodiment of the box extender 10 of the present invention is shown in FIG. 1. The box extender 10 consists of a one-piece plastic member having four integral wings 12, 14, 16, 18 extending from a face member 24. The wings consist of side wings 12, 14 and end wings 16, 18. The face member 24 has an outward side 80, an inward side 82, side portions or flanges 26, 28 and end portions 30, 32. The side flanges are narrow being from about ½ inch to about ⅜ inch but preferably approximately ¼ inch in width and serve as their primary function to stiffen the long side of the face member 24. Flanges 20, 22 extend from the side portions 26, 28 of the face. The flanges have apertures 34, 36 for receiving screws that are typically 0.145 inches in diameter. The end flanges 20, 22 stiffen the short sides of face member 24 but also are readily wide, being preferably approximately ⅝ inches in width, and serve to carry aperture 36 and to rest on the new wall but need not do so. The side flanges 26, 28 and end flanges 20, 22 are flat and thin and approximately 0.045 inches thick so that they can fit in the recessed underside (not shown) of cover plate 66. While the side flanges extend approximately 3.0 inches, which is greater than the approximately 2.8 inch length of the tubular opening of the box extender, the end flanges 20, 22 extend only approximately 1.5 inches in length which is shorter than the width of the tubular opening of the box extender which is approximately 1.8 inches wide. The end flanges preferably have a U-shaped cut-out (not shown) centered on the outer edges with a width of approximately 0.3 inches and a depth of approximately 0.2 inches. This cut-out is to accommodate the heads of screws in some installations but is not necessary as the thin flange can adapt itself if the cut-out is not used. The face member 24 and wings 12, 14, 16, 18 form a generally rectangular tubular body portion capable of receiving an electrical device and of being received within an electrical box.

Figure 2:
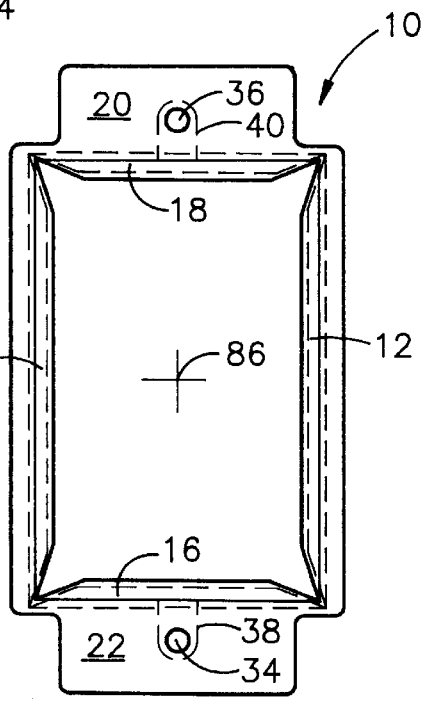
FIG. 2 is a top view of the electric box extender shown in FIG. 1.

FIG. 2 is a top view of the box extender 10 showing the flanges 20, 22 with apertures 34, 36 and the inward angled wings 12, 14, 16, and 18.

Figure 3:
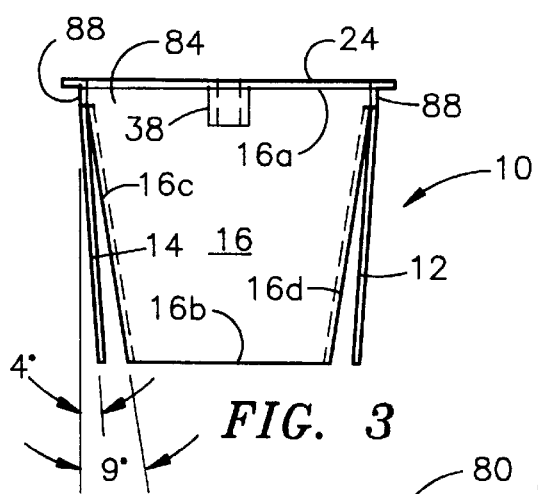
FIG. 3 is an end view of the preferred embodiment of the electric box extender with the opposite end being identical.

As shown with end wing 16 in the end view of FIG. 3, the side wings 12, 14 in their relaxed states are typically angled inwardly toward the center axis 86 of the box extender 10 at a four degree angle from perpendicular with the face 24. The axis 86 is shown in FIG. 2 and is located in the center of face member 24. The end wings (16 is depicted) are trapezoidal in shape with base end 84 containing the base edge 16a and the opposite inward edge 16b parallel. Side edges 16c and 16d are typically at an angle of 9 degrees from perpendicular with the face 24.

Figure 4:
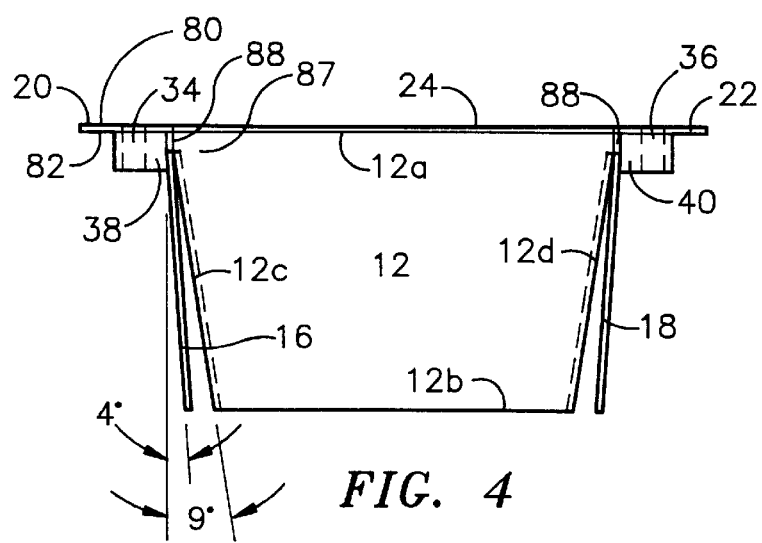
FIG. 4 is a side view of the preferred embodiment of the electric box extender with the opposite end being identical.

As shown in FIG. 4, the side wings (12 is depicted) in their relaxed states are also typically angled inwardly toward the center of the box extender 10 at a four degree angle from perpendicular with the face 24. The side wings (12 is depicted) are trapezoidal in shape with the base end 87 containing the base edge 12a and the opposite inward edge 12b parallel. Side edges 16c and 16d are typically at an angle of 9 degrees from perpendicular with the face 24. Screw guides, 38 and 40, extend from and are integral with flanges 20 and 22 respectively, contain apertures 34, 36 and provide support and guidance for the screws that will be inserted through the apertures. The screw guides are approximately ⅛ inch to ⅜ inch deep but preferably ¼ inch so as to give adequate guidance length for the screws.

The four wings 12, 14, 16, and 18 are each flat thin members having a thickness of approximately 0.035 to 0.050 inches and preferably 0.042 inches. Adjacent wings are joined by base connection 88 at their base ends 84, 87 for a length of approximately ⅛ to ⅜ inches and preferably ¼ inch. This in effect provides a right angle rigid member around the outer rectangular opening of the box extender to reinforce and stiffen it. The base ends 84, 87 are the areas from the inward side 82 of the face member 24 inward as far as the base connections 88 extend. The flexing of the wings is a cantilever bending about the imaginary line connecting the innermost end of the base connections 88. All four wings have their side edges converging toward the inward edge. The side wings 12 and 14 are preferably approximately 2⅞ inches at their base end and 2 3/16 inches at their inward edges and 1 3/4 inches deep. The end wings 16 and 18 are preferably approximately 1 7/8 inches at their base end and 1 1/4 inches at their inward edge and 1 3/4 inches deep.

Figure 5:
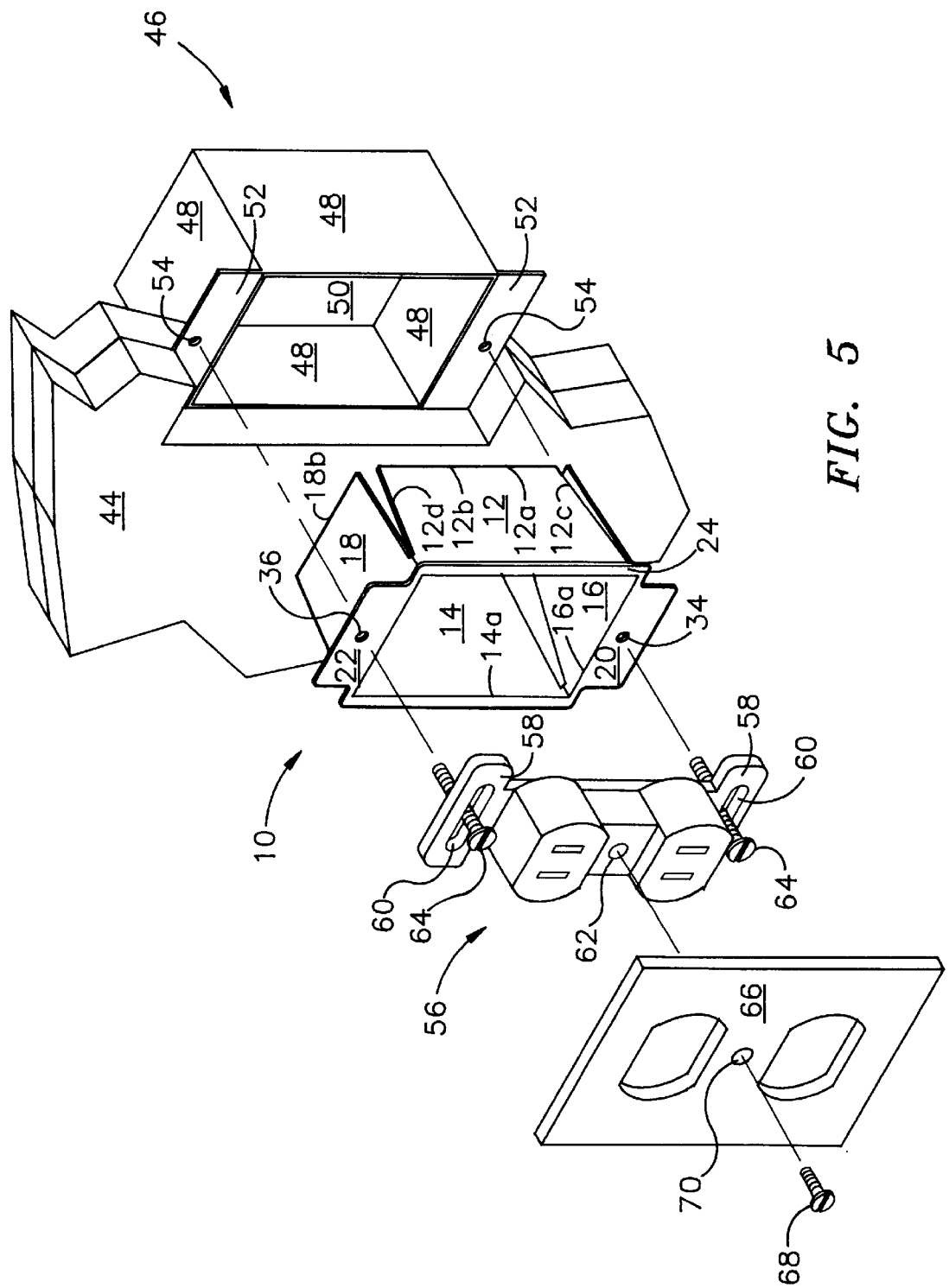
FIG. 5 is an exploded perspective view of the preferred embodiment of the electric box extender including the electric box within a wall, a duplex outlet and a cover plate.

The electrical box extender 10 is typically installed as shown in FIG. 5, an exploded perspective view with a cutaway section of an existing wall 42 and a newly installed wall 44. This is the typical arrangement when installing the box extender 10 with the existing electrical box 46 installed flush with the existing wall 42, a newly installed wall 44 on top of the existing wall 42, an opening cut in the newly installed wall 44, an electrical device 56 (in this case a duplex outlet), and a cover plate 66.

Referring to FIG. 5, the existing electrical box 46 has side walls 48 and a back wall 50. The electrical box 46 has flanges 52 and threaded apertures 54 within the flanges for receiving screws 64. These threaded apertures 54 are the same apertures that are in the electrical box 46 originally for receiving the screws that thread through the ears of an electrical device and secure the device to the box.

In a common application of the invention, the existing outlet (not shown in FIG. 5) is removed from the electrical box 46. The box extender 10 is then pushed into the electrical box 46 with the side wings 12, 14 and end wings 16, 18 slidably engaging the side walls 48 of the electrical box 46. As the side wings 12, 14 and end wings 16, 18 of the box extender are cantilevered at an angle of typically 4 degrees from perpendicular with the face 24 of the box extender 10, and as they are formed of a flexible plastic material, the wings 12, 14, 16, 18 tend to flex inwardly toward the axis of the center of the face member 24 and of the electrical box 46 thereby accommodating a wide range of sizes of electrical boxes. If the existing wires enter the electrical box 46 from the side walls 48, and those wires interfere with the travel of the wings of the box extender 10 into the box 46, then a portion of the plastic side wings 12, 14, 16, 18 may be easily manually trimmed with scissors or the like to keep the wires from interfering with the travel of the wings into the electrical box 46. If the existing wires enter the electrical box 46 through the back wall 50, there will usually be no interference of the wiring with the travel of the wings of the box extender 10 into the electrical box 46 and trimming of the wings is therefore unnecessary.

The box extender 10 is pushed into the electrical box 46 until part of the inward surface of flanges 20 and 22 and sometimes side portions 26 and 28 abut the newly installed wall 44. If the existing electrical box 46 is a shallow box, unable to accommodate the entire travel of the wings 12, 14, 16, 18 into the box 46, then the wings of the box extender 10 may be trimmed with scissors or the like so that the wings do not extend as far from the face 24 as constructed. The box extender 10 when properly trimmed will therefore accommodate a shallow electrical box.

After the box extender 10 is fully seated and abutted against the newly installed wall 44 and aligned with the electrical box 46, the duplex outlet 56, switch, or other electrical device is aligned with the box extender 10. FIG. 5 depicts a duplex outlet 56 in alignment with the box extender 10 which in turn is in alignment with the electrical box 46. The slots 60 in the ears 58 of the duplex outlet 56 are in alignment with the apertures 34, 36 in the respective flanges 20, 22 of the box extender 10 and the apertures 34, 36 are in also in alignment with the threaded apertures 54 in the electrical box 46. One long screw 64 is pushed through slot 60 in the top ear 58 of the duplex outlet 56, through the aperture 36 in flange 22, and screwed into threaded aperture 54 in the top flange 52 of the electrical box 46. A second long screw 64 is pushed through slot 60 in the bottom ear 58 of the duplex outlet 56, through the aperture 34 in flange 20, and screwed into threaded aperture 54 in the bottom flange 52 of the electrical box 46. Both screws 64 are then tightened the proper amount to abut the inward surfaces of flanges 20 and 22 against the surface of the newly installed wall 44 and to securely fasten the duplex outlet 56 to the box extender 10 and the electrical box 46. Both screws 64 may be trimmed to a shorter length or shorter screws may be used if required by a thin newly installed wall 44 or a shallow electrical box 46.

After the duplex outlet 56, switch, ground fault circuit outlet, or other electrical device is secured to the box extender 10 and the electrical box 46, then a cover plate 66 may be fastened with a screw 68 through the aperture 70 in the cover plate 66 and into the threaded aperture 62 in the duplex outlet 56, switch, ground fault circuit outlet, or other electrical device. This completes the task of extending the existing electrical device to the new wall surface 44 without installing a new electrical box or moving the existing electrical box 46. The electrical device is now flush with the new wall surface 44 and is aesthetically pleasing to the eye.

The material of construction of the box extender of this invention may be polyvinyl chloride (PVC) or any similar rigid or semi-rigid plastic such as, preferably, flame retardant polypropylene rated 105° C. continuous use made by A. Schulman company as RPP-1174. The plastic should have sufficient flexibility to enable the wings to flex or convergingly bend towards the axis of the face member as described above.

Although the typical application shown in these drawings is for the extension of a standard rectangular electrical box, a similar box extender could be formed with wings for other shaped boxes. For example, a round electrical box that is commonly used for a ceiling light may be extended by using a non-rectangular box extender with a multiplicity of wings designed to enter and slidably engage the interior walls of the round box.

Figure 6:
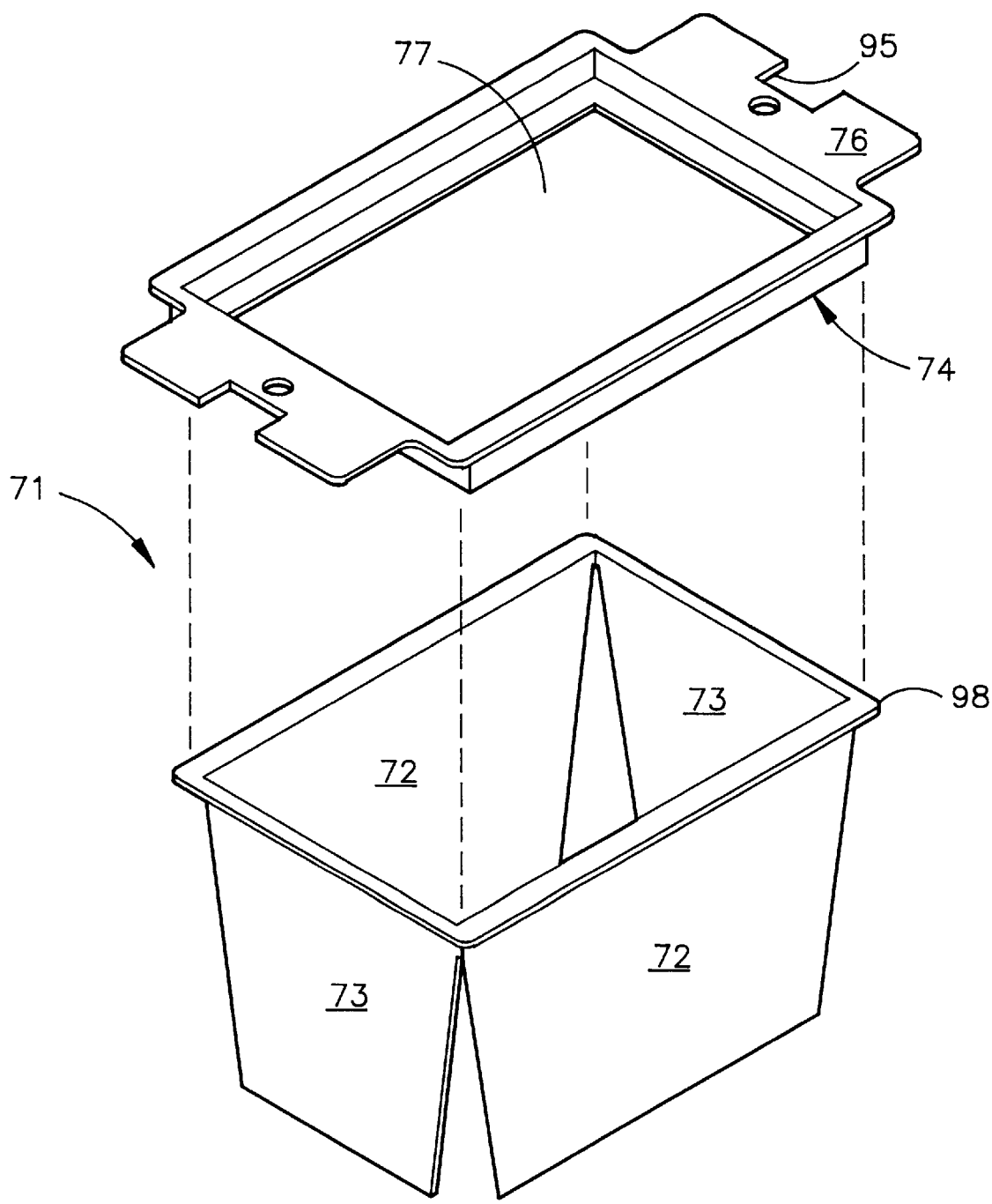
FIG. 6 is an exploded perspective view of a second embodiment of the electric box extender which includes insertable wings.

FIG. 6 is an exploded perspective view of a second embodiment 71 of the electric box extender which includes insertable wings. The second embodiment is, in effect, a two piece version of the preferred embodiment. There are two side wings 72 and two end wings 73 attached to an insertable rim 98. To form an electric box extender, the insertable rim 98 and its integral two side wings 72 and two end wings 73 are inserted or married into a complementary groove (not shown) in the back surface 74 of the face plate 76. A window 77 is formed in the center of the face plate 76 which allows space for mounting an electrical device (not shown). Also, the two U-shaped cut-outs 95 are shown. The second embodiment 71 of the box extender works in a manner analogous to the first embodiment with the exception that the second embodiment must be assembled by inserting the insertable rim 98 with integral side wings 72 and the integral end wings 73 into the groove in the back surface 74 of the face plate 76 prior to using the assembled box extender 71 with an existing electrical box recessed deep within a surface as a result of a renovation involving the installation of new sheet stock over the existing surface.

Figure 7:
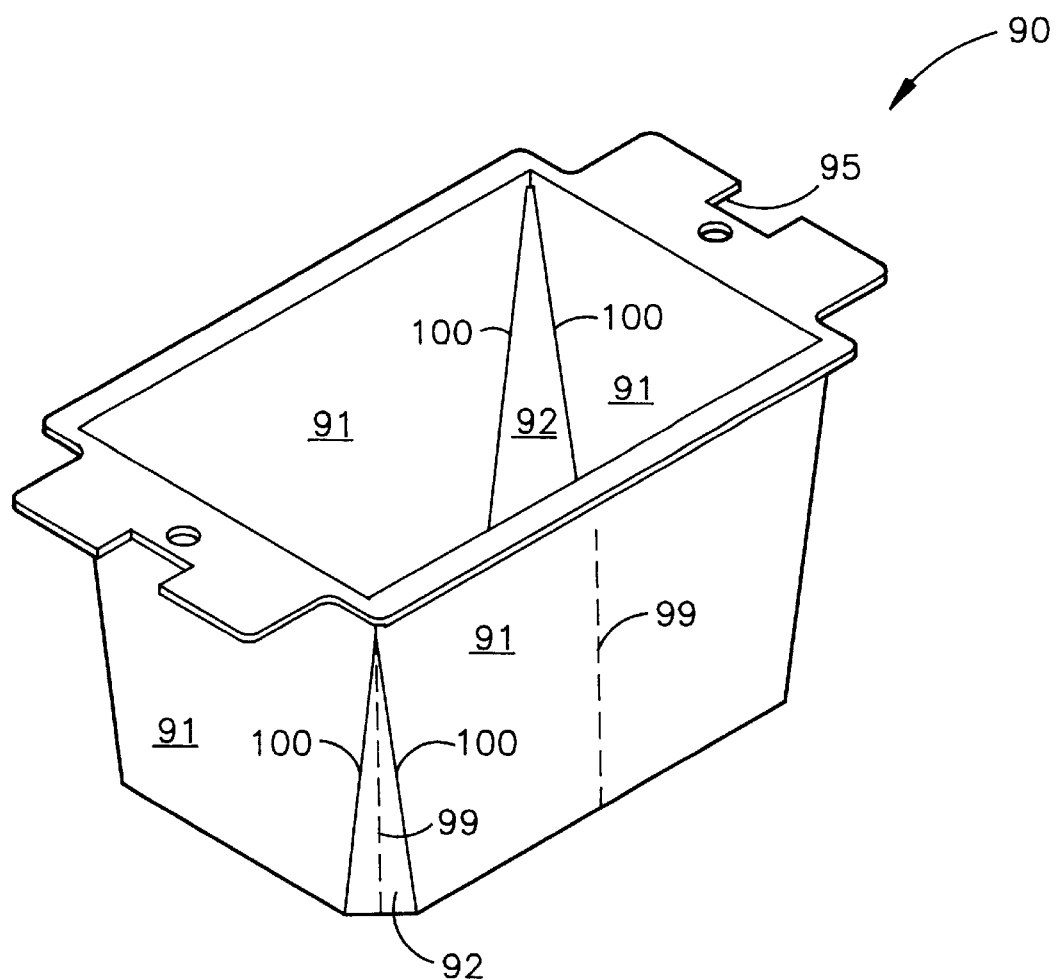
FIG. 7 is a perspective view of a third embodiment of the electric box extender which includes a one-piece extender having sides that can be easily trimmed to form wings if required in the particular installation.

FIG. 7 is a perspective view of a third embodiment 90 of the electric box extender which includes a one-piece extender having integral sides or wings 91 that can be easily trimmed to form wings if required in the particular application of the invention. If, for example, an electrical box within a wall has become recessed from the wall as a result of laying new sheet stock over the wall surface, the third embodiment 90 of the electric box extender may be used as is by sliding the sides 91 of the box extender into the existing electrical box. If resistance is encountered when inserting the box extender 90, then portions of the sides 91 may be trimmed away to allow it to fit around the obstruction. If the opening to the existing electrical box is smaller than the outer periphery of the box extender 90, then the corner walls 92 where the sides or wings 91 join may be trimmed away to create an extender with wings, similar to the first embodiment of the box extender, which may be inserted within the existing electrical box. Also, similar results may optionally be obtained by cutting on cut lines 99 in the corner walls 92 and or sides 91. The third embodiment functions similar to the preferred embodiment except for the corner walls 92 closing the corners of the wings by joining side edges 100 of adjacent wings. Cut lines 99 are located at the juncture of the corner walls 92 and sides 91.

Figure 8:
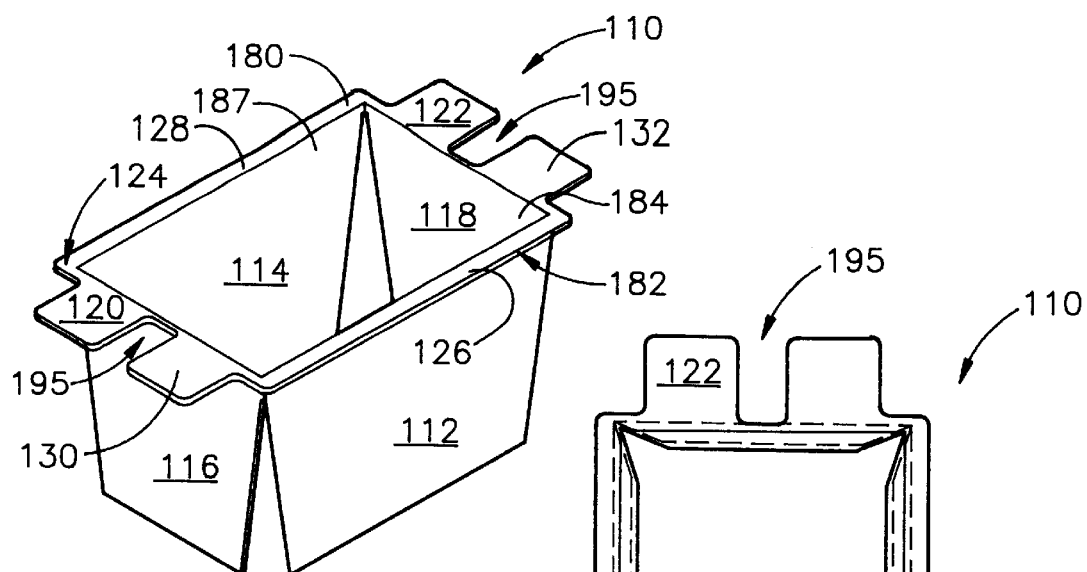
FIG. 8 is a perspective view of another embodiment of a supplemental part for an electrical box.
Figure 9:
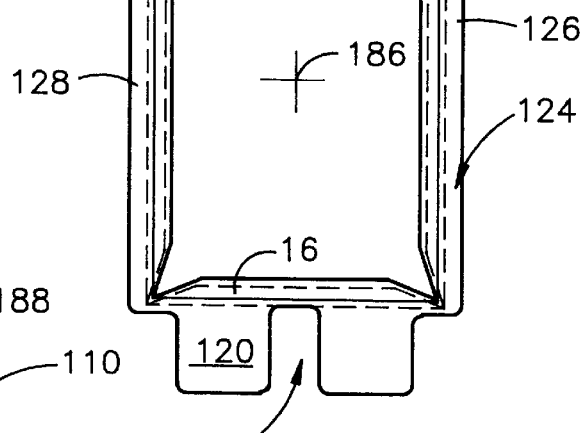
FIG. 9 is a top view of the supplemental part shown in FIG. 8.
Figure 10:
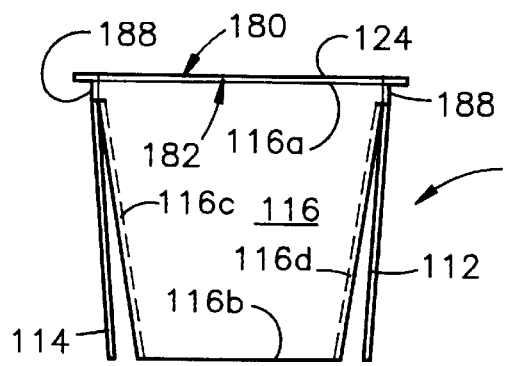
FIG. 10 is an end view of the supplemental part shown in FIG. 8.
Figure 11:
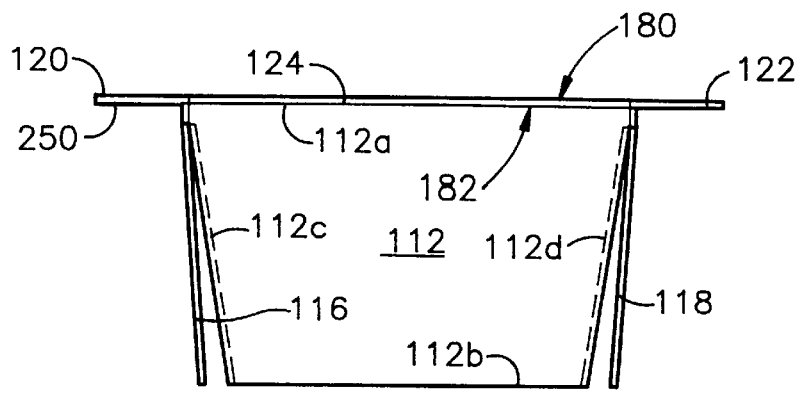
FIG. 11 is a side view of the supplemental part shown in FIG. 8

A perspective view of another embodiment of a one-piece supplemental part 110 for an electrical box is given in FIG. 8. The one-piece plastic supplemental part includes an integral face member 124 having an outward side 180 and an inward side 182 and an axis 186 through the center as shown in FIG. 9, a top view of the supplemental part. At least two flanges, 120 and 122, extend from and are coplanar with the face member 124. A plurality of inwardly extending flat wings 112, 114, 116, and 118 extend from the inward side 182 of the face member 124. Each wing, such as wing 116 depicted in the end view shown in FIG. 10, includes a base edge 116*a*, an inward edge 116*b* opposite said base edge, and two side edges, 116*c* and 116*d*, opposite one another with the wing extending from the inward side 182 of said face member 124. The wings are symmetrically disposed about an axis 186 through the center of the face member 124. The wings (112, 114, 116, and 118) and the face member form a generally tubular body portion sized to receive an electrical device with the wings capable of flexing about the face member 124 toward the axis 186 through the face thereby allowing the tubular body portion to be received within an electrical box (not shown). A U-shaped cutout 195 is included in each flange 120, 122 to allow clearance for the passage of screws therethrough for affixing an electrical device (not shown) to an electrical box (not shown). As shown in FIG. 11, the underside 250 is flat and parallel to the top or outward side 180.

The first embodiment of the supplemental part shown in FIGS. 8 through 11 is designed for use as a device insulator. The supplemental part is used for insulating the terminal strips on a bulky electrical device such as a GFCI from the interior metal walls of an electrical box, One purpose is to prevent unintentional shorting or tripping of the GFCI by inadvertent contact of the terminals on the GFCI with the walls of the electrical box. Bulky electrical devices such as the GFCI are notorious for shorts caused by the tight fit of the GFCI within the electrical box.

Figure 12:
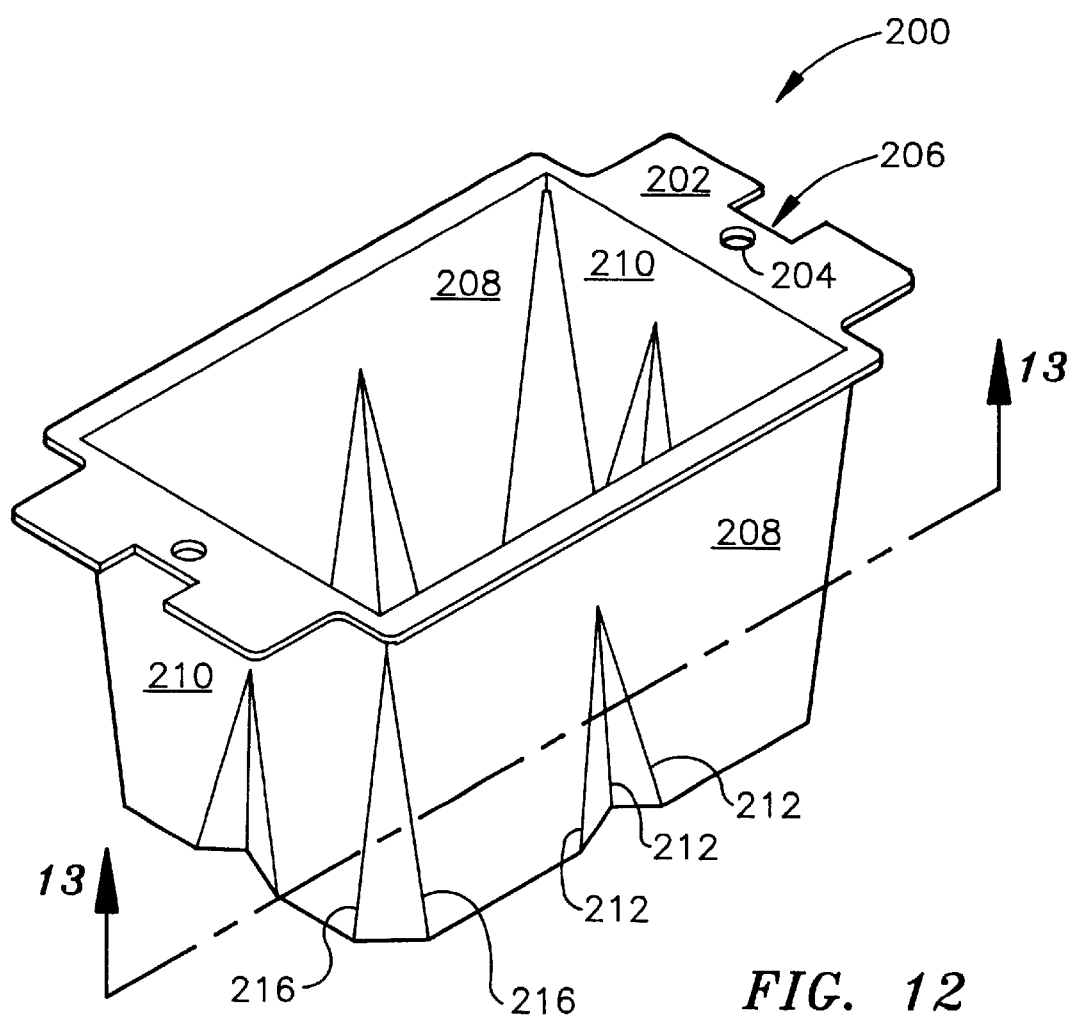
FIG. 12 is a perspective view of still another embodiment of a supplemental part for an electrical box.
Figure 13:
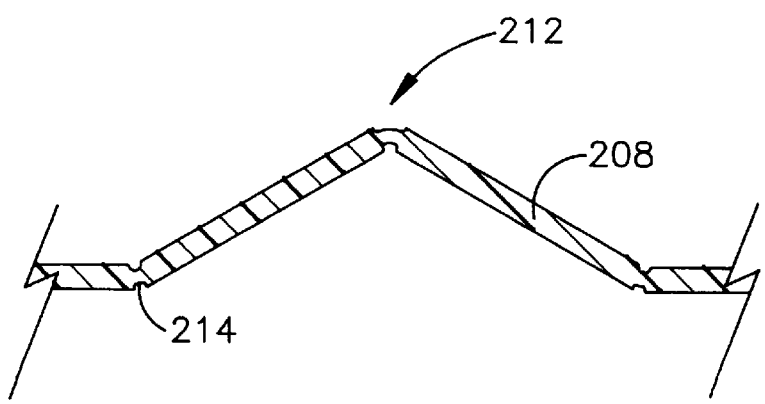
FIG. 13 is a view of a cut-away section along line 13—13 of FIG. 12, showing the flexible folds in the wall section of the supplemental part.
Figure 15:
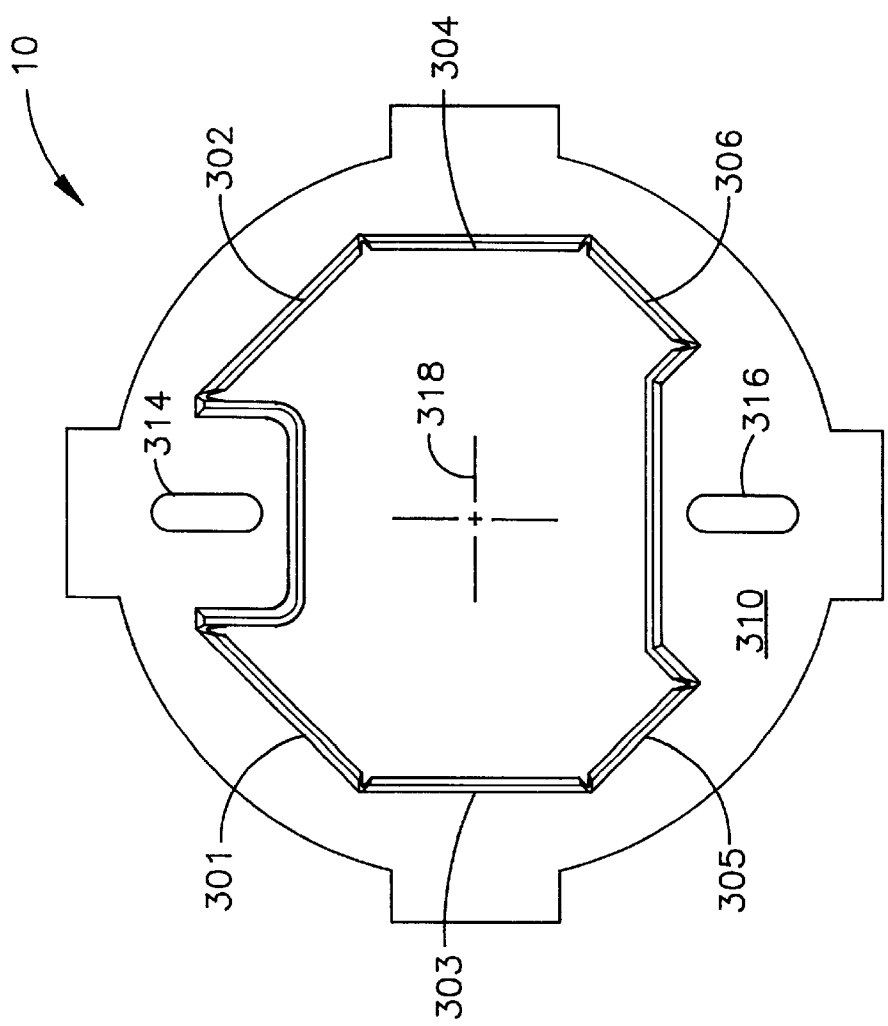
Figure 14:
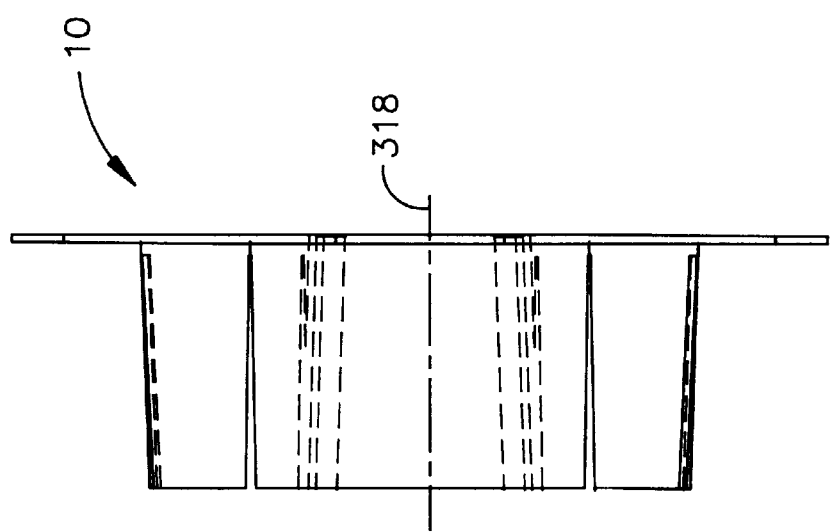
Figure 18:
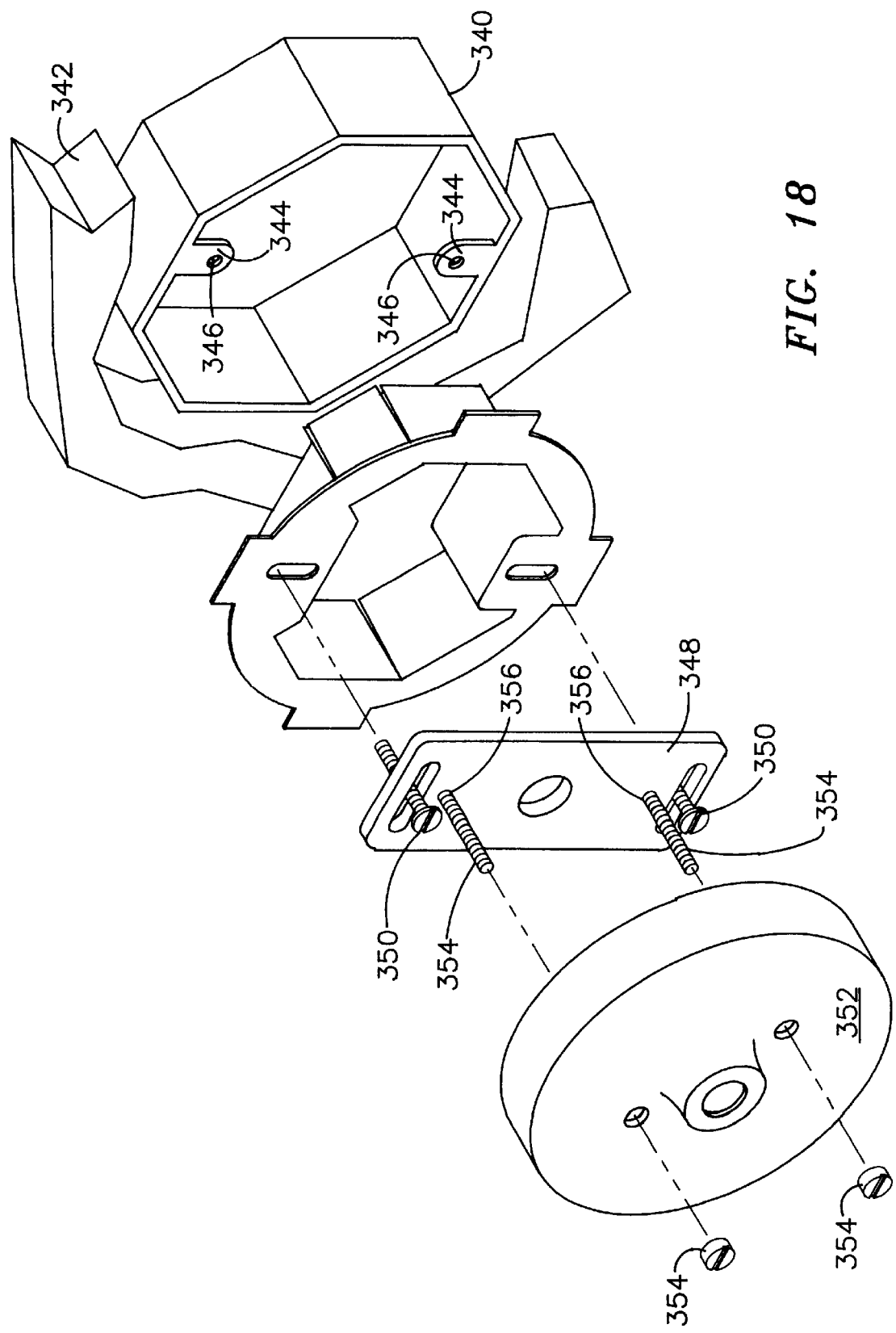

A perspective view of another embodiment of the one-piece plastic supplemental part 200 for an electrical box is given in FIG. 12. This embodiment is similar to FIGS. 1, 2, 6, and 7 with screw guides not shown. The one-piece supplemental part consists of a face member 202, apertures 204 for the passage of screws, U-shaped cutouts 206 in the end portion of the face member 202, and side walls 208 and end walls 210. One or more of the side walls 208 and one or more of the end walls 210 may contain flexible folds 212 to permit the walls to collapse inwardly toward the central axis (not shown) of the supplemental part 200 through the face member 202. As shown in FIG. 13, a cross-sectional portion of the side wall 208 taken along line 13—13 in FIG. 12, the flexible folds 212 are created molding thin wall sections 214 which define the fold lines 212 in the end walls and side walls. Referring again to FIG. 12, this particular version of the supplemental part includes fold lines which define collapsible sections along each side wall 208, and each end wall 210, and fold lines 216 at the juncture of the edges of the side walls 208 and end walls 210. All of these collapsible fold lines facilitate easy displacement of the side and end walls toward the central axis through the face member 202 thereby allowing easy insertion of this embodiment of the supplemental part into an electrical box.

With reference to FIGS. 14 to 18, there is shown a special embodiment for non-rectangular electrical boxes such as a round box, an octagonal box and, occasionally, a hexagon box.

The most common of these boxes is the four inch trade size octagonal box. Three and one-half inch trade size boxes and round boxes are also common.

This special embodiment is designed to accommodate all these common boxes using a single size having the special configuration described. Various grounding screws may also be accommodated.

As shown in FIGS. 14 to 17, the special embodiment is a one piece plastic part or box extender 10 having six flat wings 301–306, respectively. First wings 301 and 302 are of the same dimension and at one side of the box extender, second wings 305 and 306 are on the opposite side of the box extender, and third wings 303 and 304 are at opposite sides between wings 301–302 and wings 305–306.

As seen in FIG. 17, the wings have divergent spaces inward 307 to provide separations between recesses 320 and 322 and between adjacent wings which are free to flex at their base edge 308. Each wing has a base edge 308 and an inward edge 309. The base edge is affixed to the face and flange member 310. Wings being capable of flexing along both sides of each wing.

The face and flange member 310 is a thin member of approximately 0.045 inches thickness. The member is substantially circular but includes four extension tabs 312, which are of an advantage in some installations where the opening in the wall may be wider than expected. Located one each side of the face and flange member are openings 314 and 316 having a width for the receiving screws. These openings radiate outward from the axis 318 so that the screw can be placed at different radial distances from the axis depending on the installation.

Inwardly directed recesses 320 and 322 are attached to the face and flange member at their outer edge 324 and 326. Recesses 320 and 322 lay generally inboard of and under openings 314 and 316 as best seen in FIGS. 16 and 17. This permits the receiving screw to be placed through the plastic part and fastened directly to the workbox. The first recess 320 has a relatively narrow inner wall 328 along with two relatively wider outer walls 330 and 332. The second recess is relatively wider with a wider inner wall 334 and two relatively narrow angular walls 336 and 338.

This design is made to accommodate by a single part a multiplicity of workboxes. In use, the workbox of the special embodiment of FIGS. 14–18, are placed over a workbox 340 mounted in a surface such as a drywall 342 with attachment tangs 344 having internal screw thread holes 346. The box extender utilizes a bracket 348 supplied by others with fasteners 350 to attach the box extender by screwing directly to the two tangs 344 of the workbox. To complete the installation, a fixture canopy supplied by a fixture company uses two screws 354 to screw into threaded opening 356 in the bracket.

The dimensions of the plastic part 10 are 4.850 inches in overall width including the tangs 312. The circular width is 4⅜ inches. The height is 1.500 inches. The first recess 320 is 9/16 inch deep and 1½ inches wide. The second recess 322 is ¼ inch deep and the two walls 336 and 338 are angled outward at 45° and are ¼ inch wide.

The flat wings 301, 302, 303 and 304 are 1.375 inches wide and the flat wings 305 and 306 are 0.924 inches wide.

Although there has been shown and described an example of what is at present considered preferred embodiments of the present invention, it will be obvious to those skilled in the art that various changes and modifications may be made therein without departing from the scope of the invention as defined by the appended claims.

What is claimed is:

1. A one piece plastic part for a non-rectangular electrical box comprising:
    a face and flange member having an outward side and an inward side and an axis through the center of said face and flange member
    a plurality of inwardly extending flat wings each having a base edge and an inward edge opposite said base edge with said wings extending from the inward side of said face and flange member;
    said wings disposed about said axis through the center of said face and flange member;
    said wings and said face and flange member forming a generally tubular body portion sized to be placed in an electrical device;
    said wings capable of flexing about said base edge toward said axis through said face and flange member thereby allowing said tubular body portion to be received within the electrical box;
    an inwardly extending first recess having a base edge, an inward edge opposite said base edge of said first recess, an inner wall and two side walls extending sideways from said inner wall with said base edge of said first recess affixed to said face and flange member;
    an inwardly extending second recess having a base edge, an inward edge opposite said base edge of said first recess, an inner wall and two side walls extending sideways from said inner wall with said base edge of said first recess affixed to said face and flange member; and
    at least two openings through said face and flange member having a width capable of passing screws therethrough for fastening to the electrical box.

2. The part of claim 1 wherein said wings are six in number.

* * * * *